Aug. 10, 1943.  R. R. ANDERSON  2,326,318
METHOD AND APPARATUS FOR COMPARTMENT HEATING
Filed Dec. 16, 1940  2 Sheets-Sheet 1

INVENTOR
Rex R. Anderson
BY Roy A. Plant
ATTORNEY

INVENTOR
Rex R. Anderson
BY Roy A. Plant
ATTORNEY

Patented Aug. 10, 1943

2,326,318

UNITED STATES PATENT OFFICE 2,326,318

METHOD AND APPARATUS FOR COMPARTMENT HEATING

Rex R. Anderson, Marshall, Mich.

Application December 16, 1940, Serial No. 370,369

5 Claims. (Cl. 237—69)

The present invention relates broadly to compartments having a special air circulating system, and in its specific phases to a house trailer having a hollow double floor, an air treating system, and a means for circulating air from the trailer interior through the hollow double floor of same and back into the trailer interior.

House trailers are rapidly being adopted for year round living quarters. Where such trailers of conventional construction are used in cold weather at temperatures below freezing, they present the difficulties of stratified heated air with an exceedingly cold floor, together with sweating walls and even the formation, in freezing weather of approximately 15° F. or below, of frost on the walls and floor at the ends of the trailer remote from the heating stove. I discovered that such difficulties can be avoided by providing the house trailer with a hollow double floor and circulating air in either direction but preferably in series from the passageway in the hollow double floor through the heating portion of the stove into the interior of the trailer compartment, and then back into said passageway in the hollow double floor through registers at the ends of the trailer for return to the stove for reheating and recirculation. That invention is set forth in my patent issued December 17, 1940 as Patent No. 2,225,244. Such system I have now found can be modified to a considerable extent and still accomplish satisfactory results. My present modified system utilizes a hollow double floor with the heating stove preferably mounted thereon but not connected for circulation of air directly in series therethrough. The heating stove under these conditions supplies the heat to the interior of the trailer compartment according to long established practice with single floor trailers. A separate air circulating system is provided so as to take air from the interior of the trailer compartment, deliver it to the hollow passageway through the floor and then return same back to the trailer interior. Operation in this manner provides a warm floor and due to the circulation of air from the very ends of the trailer interior, practically eliminates stratification of heated air as well as condensation of moisture supplemented by the freezing of same to the walls and floor at the ends of the trailer compartment.

Accordingly, among the objects of the present invention is the provision of a compartment such as an insulated trailer body, or the like, with a double floor, the bottom of the floor being insulated and the top floor spaced therefrom to form an air passageway between the floors, a heating system, and means for circulating air through said passageway independent of said heater.

Another object is to construct a trailer, or the like, so as to provide a warm floor with connections for heating and ventilating wardrobe rooms, toilet room, trunk compartment, cupboards, or the like, which is particularly advantageous in cold weather.

Another object is to provide a double floor trailer or the like having an air passageway between floors with a double air circulation system, each of which is independent of the other although they overlap to the extent of using the trailer interior as part of the circulation system of each.

Another object is to provide for reversible air flow through the air circulation system including the air passageway between floors of a house trailer or the like, thus permitting variations to take care of desired circulation of air during heating in winter and cooling in summer.

A further object is to provide means for controlling the rate of circulation of air through a passageway in the double floor of a house trailer or the like.

A further object is to provide means for discharging a portion of the used air from the trailer compartment while bleeding fresh air thereinto in suitable replacement quantity.

A still further object is to provide means for better circulation of air in a trailer compartment by means of a dual circulation system so that the temperatures therein will be relatively uniform throughout.

A still further object is to provide a new method of heating and conditioning the air in house trailers and the like.

Still further objects and advantages of the invention will appear as the description proceeds:

To the accomplishment of the foregoing and related ends, the invention, then, consists of the methods and means hereinafter fully described and particularly pointed out in the claims, the annexed drawings and the following description setting forth in detail certain means and modes of carrying out the invention, such disclosed means and modes illustrating, however, but several of various ways in which the principle of the invention may be used.

Figure 1:
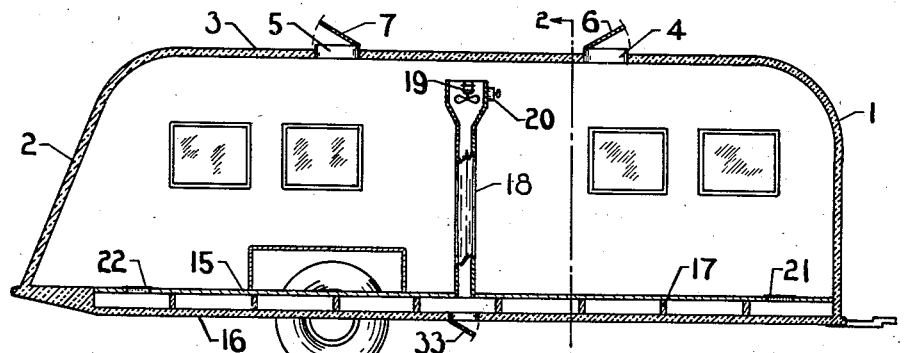
Figure 1 shows a sectional elevation of a house trailer embodying in diagrammatic manner certain features of the present invention, as viewed in the direction of the arrows along line 1—1 of Figure 2.
Figure 4:
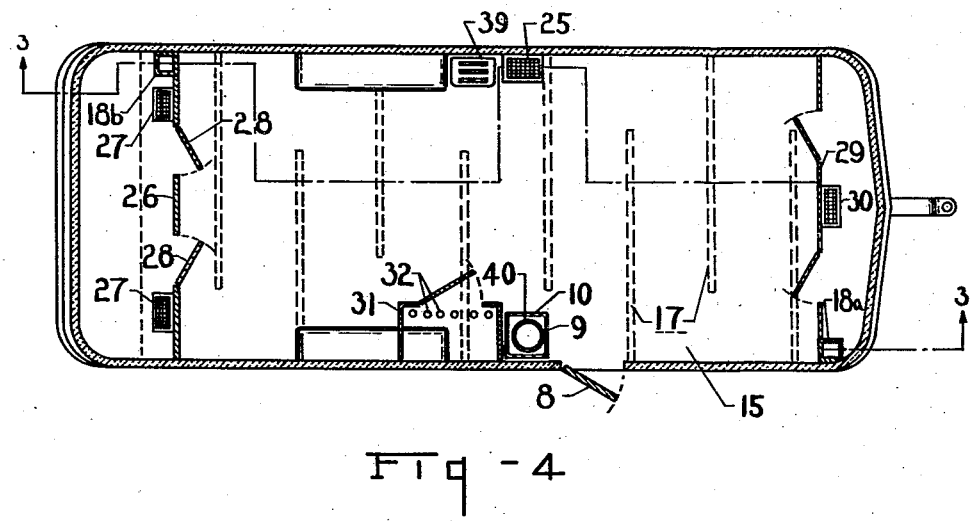
Figure 4 is a sectional plan view of a house trailer embodying in diagrammatic manner certain features of the present invention, as viewed in the direction of the arrows along line 4—4 of Figure 3, but with certain fittings added.

For simplicity of understanding the present invention, it has been diagrammatically shown in connection with a house trailer devoid of interior fittings and equipment aside from the heater and a few other items as particularly shown in Figure 4. Referring more particularly to the drawings, Figure 1 shows a house trailer 1 having insulated side and end walls 2, and an insulated roof 3. In conventional construction, the roof is provided with ventilators 4 and 5 which have hinged adjustable hatches 6 and 7. Ingress and egress from the trailer is had in conventional manner by means of a door 8, Figure 4.

Due to the cold air which flows into the trailer when the door is opened in cold weather, it is common practice to mount the stove 9 at one side of the doorway. For simplicity of showing the present invention, this standard construction is illustrated, although it is to be understood that the invention is not limited to the placing of the stove in this specific location. There are many forms of stoves, both of the fan equipped and plain types, adapted for use in trailers and diagrammatically they may be shown as consisting of a housing 10 with cold air inlet 11 in the side of housing 10 and adjacent the bottom thereof. The upper end of the housing 10 is usually provided with vent openings 12 through which heated air passes into the trailer compartment. A conventional fire pot 40, Figure 4, is provided inside of housing 10 and the products of combustion of fuel in such fire pot pass up chimney 13, Figure 2, and out of the upper end of same which is preferably provided with a conventional chimney hood 14. Operation of the stove under these conditions results in air passing into the heating portion of the stove through inlet 11 near the floor, and following heating this air is discharged from the stove through vent openings 12 from whence it rises to the upper portion of the trailer compartment and thence back to inlet 11 of the stove after cooling. This conventional heating procedure when used alone results in stratified air with poor circulation to the remote ends of the trailer compartment, and the latter is made still more pronounced where partitions are utilized for dividing the trailer at least partially into rooms.

In the place of the conventional single floor used in house trailers, the present invention involves the use of a double floor, preferably of tight construction throughout as shown, aside from small registers at prescribed locations. This type of construction avoids detrimental short circuiting of air circulating within the trailer, and insures relatively uniform temperatures from end to end of the trailer compartment when the trailer is constructed and the air therein circulated as will be hereinafter more particularly described. This double floor is provided with a top panel 15 and a lower or bottom panel 16, the latter in turn being provided with insulating material of any suitable type which is preferably in sheet form. Sheet material of fibrous and cellular nature such as is obtainable on the market under the name of Celotex is well adapted for this purpose. Normally an inch thickness of this material on the bottom of the trailer is ample for the purpose at hand, although the invention is not limited to that specific thickness of insulation. Where the under face of the floor is exposed to the elements, it is preferable to cover the exposed face with asphaltic paint or other water resisting material. The top panel 15 of the floor is adjacent to, but spaced from the lower panel 16 of the floor in conventional manner, for instance by means of spacers 17. These spacers 17 have been diagrammatically shown as cross members extending alternately from first one side of the trailer and then the other but falling short of reaching the opposite side thereof so as to produce a staggered air flow between the floors from inlet to outlet. The invention, however, is not limited specifically to cross members since obviously the longitudinal frame members (not shown) in the floor, or other forms of spacer members may be used in equivalent manner so long as the circulation of air between the top and bottom panels of the floor from inlet to outlet warms a major portion if not the whole area of the top panel. The showing of spacers 17 in the drawings is therefore to be considered as diagrammatic of the various equivalent constructions adapted to accomplish the purpose of the present invention. In preferred construction the air passageway in the double floor will underlie an area of the top panel of the floor at least as large as the exposed upper surface of same. The terms "air passageway," "shallow air passageway," "relatively wide but shallow air passageway," et cetera, are intended to cover the various forms of construction typically described herein, regardless of whether the passageway is divided into a plurality of air flow channels by means of supports for the upper floor panel, the frame, or otherwise.

Figure 2:
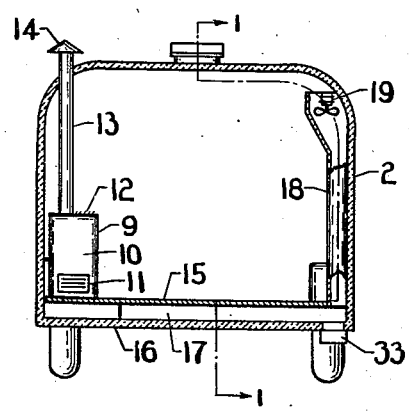
Figure 2 is a sectional elevation view of a house trailer embodying in diagrammatic manner certain features of the present invention, as viewed in the direction of the arrows along line 2—2 of Figure 1 with certain parts broken away for clarity of understanding.

In addition to the circulation of air in the stove circuit due to the use of a fan or the mere heating of air therein, there is a second independent air circulating system present. One form of this second air circulating system is illustrated in Figures 1 and 2. In this construction an air duct 18 connects at its lower end to the shallow air passageway between upper and lower panels 15 and 16 of the double floor. The upper end of this air duct is open at a point adjacent the ceiling of the trailer compartment. Mounted in this duct for forced flow of air therethrough is electric fan 19 which may be operated in either direction and thus determine the direction in which circulation will take place under operating conditions. A rheostat 20, Figure 1, may be connected in the electric circuit to the fan for controlling the operating speed of same with resultant regulation of rate of circulation of air to suit the desire or requirements of the user. It is normally desirable to operate the fan so as to draw air from a point adjacent the ceiling of the trailer compartment and force same through the passageway in the double floor to the ends thereof from whence such air will be discharged through floor registers 21 and 22, which are preferably mounted in the top panel of the floor adjacent the front and rear ends of the trailer compartment to facilitate circulation therethrough and eventual recirculation by means of fan 19. Circulation of air in this direction presents the advantage that the air heated by the stove naturally rises to the ceiling where a portion of it is available for forcing by means of fan 19 through the floor passageway in manner warming the upper panel of the floor and at the same time causing circulation to take place to the very ends of the trailer compartment.

Figure 3:
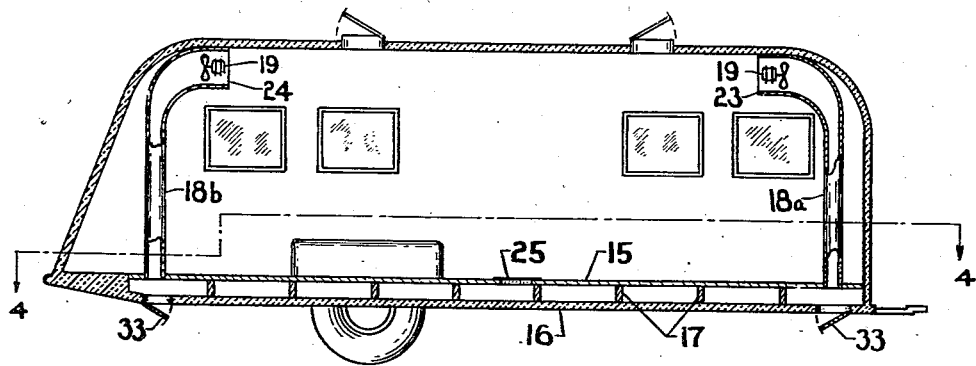
Figure 3 shows a sectional elevation of a house trailer illustrating a modification of the system shown in Figure 1, and as viewed in the direction of the arrows along line 3—3 of Figure 4, but with the cupboards and air cooler omitted.

Instead of using a single air duct 18 as shown in Figure 1, this may be modified by the use of air ducts 18a and 18b, Figure 3, at the front and rear of the trailer compartment. In order to facilitate placing these air ducts at the ends of the trailer compartment they may be provided with horizontal opening upper ends 23 and 24. In this case the upper floor panel 15 is preferably provided with a floor register 25 at a point approximately mid-length of the trailer compartment. Each of the air ducts 18a and 18b in this type of construction will be provided with an electric fan 19 which may be operated in either direction for heating purposes. It is, however, normally desirable to operate these fans so as to simultaneously force air down air ducts 18a and 18b into the shallow air passageway in the double floor and thence out of register 25 and into the compartment interior for recirculation. This facilitates warming the floor and makes the temperature within the trailer interior relatively uniform throughout.

The operation of electric fan or fans 19 for flow of air through the duct or ducts, as described in connection with the apparatus of Figures 1 and 3, results in the air, which is in the shallow air passageway in the double floor, being under pressure slightly in excess of the air pressure within the trailer compartment. Under these conditions if it is desired to warm the back cupboard 26, Figure 4, which may include a trunk section with back or side entrance (not shown), one or more small registers 27 may be placed in the top panel 15 of the double floor inside of said back cupboard. This procedure will allow warmed air to be forced into the cupboard for warming same, and the circulation of such warmed air through the cupboard may be increased by either opening one of the cupboard doors 28 or by providing conventional vent openings (not shown) therein according to standard practice. Front cupboard 29 may be warmed in similar manner to the rear cupboard by placing a suitable small register 30 therein. The warming and ventilating of separate rooms such as a toilet room or wardrobe room 31 may be readily accomplished by placing a small register or vent openings 32 in the floor thereof.

Figure 5:
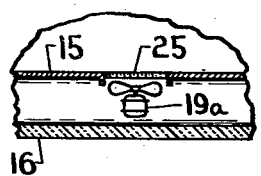
Figure 5 shows an enlarged fragmentary view illustrating a modification of a portion of the air circulating system.
Figure 6:
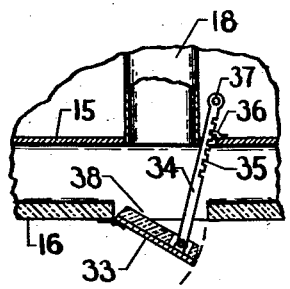
Figure 6 shows an enlarged fragmentary view of a connection to the passageway in the double floor supplemented by an adjustable outside air connection mechanism.

Instead of using an electric fan 19 in the upper end of air duct 18, or 18a, and 18b this fan or fans may be eliminated and in the place thereof an electric fan 19a, Figure 5, may be mounted in the air passageway of the double floor, for instance below floor register 25 as shown in typical location in Figures 3 and 4. The operation of this fan for blowing air upward through the register will cause the air pressure in the floor passageway to be slightly less than the pressure in the compartment interior. As a result, air will flow into the floor passageway through the vertical air ducts 18, or 18a, and 18b as well as through small registers 27 and 30 in the cupboards, and vent openings 32 in room 31. Flow of air in this manner also acts to provide not only the desired circulation to the very ends of the trailer compartment but also to warm the cupboards, et cetera where such is desired and register means or the equivalent provided to accomplish same.

Where it is desired to freshen the air within the trailer compartment this may be accomplished for instance by means of a suitable ventilating member or members 33. Such member is preferably placed in the bottom panel 16 of the floor and may be made adjustable in various conventional ways. One mechanism for accomplishing this is typically shown in Figure 6 where the ventilating member 33 is shown to be hinged to bottom panel 16. The opening of this ventilating member may be conventionally controlled by means of a pivoted link member 34 which for convenience of adjustment may be provided with ratchet teeth 35, and an operating handle 37 at the upper end thereof. An engaging member 36 may be mounted on top panel 15 of the floor for engaging ratchet teeth 35 and holding ventilating member 33 in desired position. Ventilating member 33 may be placed at practically any location on bottom panel 16 of the double floor for operation in this manner. However for convenience of location same may be placed directly below air duct 18 so that under down flow of air under pressure exerted by an electric fan at the upper end of said air duct, at least a portion of said air will be forced out of the opening 38. The amount of air discharged in this manner will depend to a large extent upon the amount that ventilating member 33 is opened, and the rate of air circulation. The air discharged in this manner will normally be replaced with air drawn into the compartment interior around the windows, door, through the roof ventilators, et cetera. Where the air in the shallow air passageway is under a lower pressure than in the interior of the trailer compartment, as described in connection with Figure 5, fresh air will be drawn in through opening 38 and a proportionate amount of air from the trailer interior will be forced out of same around the door, windows, through the roof ventilators, et cetera.

Where it is desired to cool the trailer compartment during hot weather, a cooling unit 39, Figure 4, may be installed within the trailer compartment and preferably adjacent floor register 25. By operating fan or fans 19 so as to draw air out of the floor passageway and deliver same through the air ducts to the upper portion of the trailer compartment, at least a portion of the cool air produced by cooling unit 39 may be drawn through floor register 25 and discharged from the upper end of the air ducts for cooling the whole of the trailer compartment. This cooling unit, it is to be noted, operates in similar manner to the stove by having its own cool air circulation system which also partially overlaps the second air circulation circuit which includes the shallow passageway in the floor, the duct or ducts, and the compartment interior.

Other modes of applying the principle of my invention may be employed instead of those explained, change being made as regards the means and the methods herein disclosed, provided those stated by any of the following claims or their equivalent be employed.

I therefore particularly point out and distinctly claim as my invention:

1. In the method of heating and conditioning the air in a compartment having an externally exposed tight construction double floor with air passageway therebetween extending substantially full length of the floor and connected to the interior of the compartment by relatively widely spaced apart small inlet and outlet openings which are within said compartment and at least one of which is at one end thereof, said passageway underlying a major portion of the floor area, the steps which comprise supplying heat to air at a suitable point in said compartment, circulating said heated air through a closed circuit including the interior of said compartment, returning at least a portion of said air to said point of supply of heat thereto, and independently circulating air from said compartment through said air passageway and back into said compartment through a second closed circuit overlapping part of said heating circuit by including the interior of said compartment as part thereof, whereby the air in said compartment is kept at relatively uniform temperature throughout, and the floor of the compartment is warmed.

2. The method of heating the interior of a compartment having a floor which is externally insulated and exposed, said floor having tight construction top and bottom panels spaced apart to form a shallow air passageway therebetween substantially co-extensive with said floor, and an air heating means above said floor and within said compartment but not directly connected to said passageway in said floor, which comprises the steps of generating heat in said heating means, circulating air through said compartment interior into heat absorbing relation with said heat generating means, and thence back into said compartment interior, and independently circulating air through a second circuit overlapping part of said heating circuit, the circulation through said second circuit involving the steps of removing air from said compartment interior, adjacent the ceiling thereof, circulating said air under forced flow through said passageway in the floor to warm the upper face of same throughout a major portion of its area, and then returning said air to said compartment interior.

3. The method of heating the interior of a compartment having a floor which is externally insulated and exposed, said floor having tight construction top and bottom panels spaced apart to form a shallow air passageway therebetween substantially co-extensive with said floor, and an air heating means above said floor and within said compartment but not directly connected to said passageway in said floor, which comprises the steps of generating heat in said heating means, circulating air through said compartment interior into heat absorbing relation with said heat generating means, and thence back into said compartment interior, and independently circulating air through a second circuit overlapping part of said heating circuit, the circulation through said second circuit involving the steps of removing air from said compartment interior, adjacent the ceiling thereof, circulating said air under forced flow through said passageway in the floor to warm the upper face of same throughout a major portion of its area, returning said air to said compartment interior, admitting some fresh air to said circulating air, and discharging from said circulating air an amount thereof corresponding approximately with the amount of fresh air admitted thereto, whereby the air in the compartment interior is freshened, the floor over the passageway warmed, and the temperature within the compartment is caused to be relatively uniform throughout.

4. An apparatus of the character described, which comprises a compartment having a double floor with a wide but relatively shallow air space therebetween extending under a major portion of the floor area, means for conditioning the air in said compartment, a duct with an open upper end near but below the ceiling of said compartment, means for joining the lower end of said duct to the air space in said double floor for flow of air in series therethrough, at least one connector for directly connecting the lower portion of the interior of said compartment with said air space in said double floor for flow of air in series therethrough, and means for circulating air through a closed circuit comprising the compartment interior, duct, air space in the double floor, and connector, said air conditioning means forming part of a closed circuit independent of the closed air circulating circuit which has as a part thereof the air space in said double floor, but using the interior of said compartment as a common portion of both circuits.

5. An apparatus of the character described, which comprises a compartment having a double floor with a wide but relatively shallow air space therebetween, extending under a major portion of the floor area, means for heating the air in said compartment, a duct with its upper end open near but below the ceiling of said compartment and connected at its lower end to the air space in said double floor, at least one connector extending between said air space in the floor and the interior of said compartment for directly connecting same, and means for circulating air through said air space in the double floor and through said duct and connector which joins same to the compartment interior, said air heating means forming part of a closed air heating circuit independent of said air circulating circuit through the air space in the double floor but using the interior of said compartment as a common portion of both circuits.

REX R. ANDERSON.